Sept. 5, 1944.    E. BAGNALL    2,357,299
STABILIZER
Filed Nov. 6, 1940
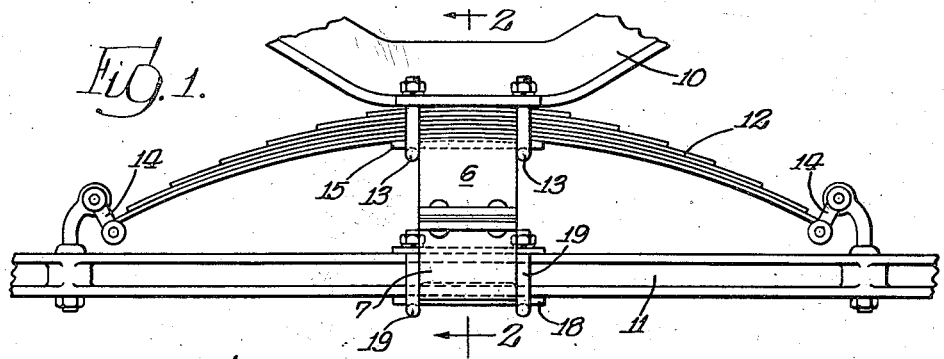
Fig. 1.
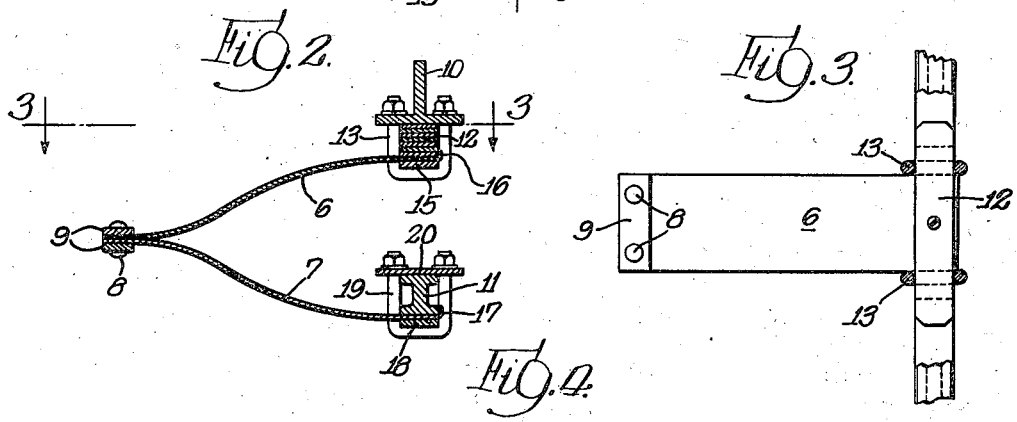
Fig. 2.    Fig. 3.
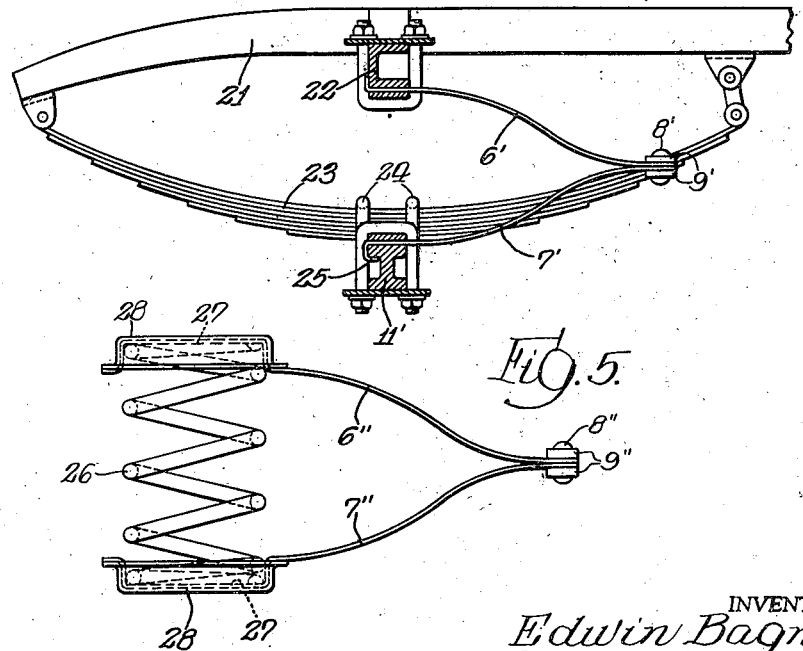
Fig. 4.
Fig. 5.
INVENTOR.
Edwin Bagnall,
BY Ernest A. Wegner
his Atty.

Patented Sept. 5, 1944

2,357,299

UNITED STATES PATENT OFFICE 2,357,299

STABILIZER

Edwin Bagnall, Chicago, Ill.

Application November 6, 1940, Serial No. 364,509
In Canada September 30, 1940

13 Claims. (Cl. 267—67)

The invention relates to a stabilizer for automotive vehicles and has as a general object to provide a stabilizer of new and improved construction.

All automotive vehicles, particularly passenger vehicles, are designed to be in balance when the body and chassis frame are in normal position relative to the front and rear axles. To maintain that balance and the proper distribution of weight when the vehicle is in motion is a problem difficult of solution. Inasmuch as most spring mountings have a pivotal, or at least non-rigid, connection either with the axle or with the chassis frame, shift of the axle relative to the chassis frame constitutes one of the major causes of instability resulting in what is commonly known as "tramp," "floating" or "road wander." This instability is caused in part by the unbalancing of the weight distribution and part by actual pivoting of the front wheels. Inasmuch as the steering mechanism is mounted on the chassis frame, while the front wheels are mounted on wheel-carrying parts not rigid with the chassis frame, shift of the wheel-carrying parts relative to the frame must result either in a pivoting of the wheels or a turning of the steering wheel. Since, normally, the driver holds the steering wheel against turning, pivoting of the wheels results with a consequent change in direction of the automotive vehicle.

It is therefore an important object of the invention to provide a new and improved stabilizer that tends to prevent axial shift of the axle or wheel-carrying part transversely relative to the chassis frame, thereby eliminating "road wander," reducing wear on tires and pivotal points in the mounting of the wheels, and contributing to the safety, improved control, and decreased effort in driving.

Another object is to provide a stabilizer which serves in other respects to maintain the supporting parts of an automotive vehicle chassis in functional balance and thus improve the driving and riding qualities of the vehicle, among such respects being the support given to the center of the axle to counteract the strain imposed during high forward velocities.

Still another object is to provide a stabilizer of the character described which has no moving parts to wear, which may be economically manufactured, and which may be readily installed at the factory as standard equipment or as auxiliary equipment at any service station.

Other objects and advantages will become apparent from the following detailed description taken in connection with the accompanying drawing, in which:

Fig. 1 is a fragmentary elevational view taken from the rear of the front axle of an automotive vehicle having transverse springing, showing the stabilizer embodying the features of this invention in applied position.

Fig. 2 is a sectional view taken approximately along the line 2—2 of Fig. 1.

Fig. 3 is a fragmentary plan view taken approximately along the line 3—3 of Fig. 2.

Fig. 4 is a sectional view taken in a plane transverse to the axle of an automotive vehicle showing the stabilizer of Figs. 1 to 3 as applied to an automotive vehicle having semi-elliptical springing.

Fig. 5 is a view showing the stabilizer of Figs. 1 to 3 applied to an automotive vehicle having coil springs.

While the invention is susceptible of various modifications and alternative constructions, it is here shown and will hereinafter be described in a preferred embodiment and as adapted for application to automotive vehicles having the three different types of springing. It is not intended, however, that the invention is to be limited to the specific constructions shown but, on the contrary, it is intended to cover all modifications and alternative constructions falling within the spirit and scope of the invention as defined in the appended claims.

The stabilizer forming the subject matter of this invention basically consists simply of a means which is rigidly connected to both the chassis frame and to the axle or other wheel-carrying part, which means is so constructed that it resists a shift of the wheel-carrying part axially transversely relative to the chassis frame, while at the same time presenting no interference to the normal vertical movement of the wheel-carrying part relative to the chassis frame under the control of the spring. Moreover, this stabilizer is a resilient, unitary means free of pivotal or other relatively movable connections subject to wear and requiring lubrication and other attention. Such a means comprises simply a pair of leaf elements 6 and 7 which are suitably connected to one another at one end and in the applied condition of the stabilizer diverge and have their free ends respectively attached rigidly to the chassis frame and to the axle.

In the form herein disclosed for exemplary purposes, the elements 6 and 7 are individual leaves secured together at one of their ends by suitable means, such as rivets 8, though it is to be understood of course that the elements 6 and 7 might constitute parts of a single strip bent upon itself. Preferably, reinforcing metal strips 9 are placed on opposite sides of the elements 6 and 7, and through the medium of which the rivets 8 act to provide a stronger joint. The elements 6 and 7 are of a high quality steel, preferably spring steel, and are made thin so as to be readily flexible and thus not interfere with the normal relative vertical movement between the axle or wheel-carrying part and the chassis frame. At the same time, the elements 6 and 7 are made comparatively wide so as to offer tremendous resistance to distortion, that is, to have substantial rigidity in the plane of the elements. In this connection, it is pointed out that two or more rivets 8 are employed to secure the elements together so that there may be no pivoting of one element relative to the other. By way of example, the thickness of the elements may be in the order of one-sixteenth of an inch, while the width of the elements is in the order of six inches.

In Figs. 1 to 3, the stabilizer is shown applied to an automotive vehicle having transverse springing. Such a vehicle has a chassis frame a portion of which is represented at 10, an axle 11 extending transversely of the frame, and a spring 12 also extending transversely of the chassis frame. Conventionally, the spring 12 is secured intermediate its ends to the frame 10 through the medium of U-bolts 13 and is connected at its ends to the axle 11 through shackles 14. It is believed readily apparent from a consideration of Fig. 1 that this type of springing is particularly susceptible of relative transverse movement between the axle and the frame and thus particularly susceptible of producing in a vehicle in motion "road wander" and the other undesirable conditions before mentioned. It is with this type of springing that the stabilizer is unusually effective, though the stabilizer produces improved riding and driving qualities in automotive vehicles having other types of springing.

When the stabilizer is applied to an automotive vehicle having transverse springing, only a single stabilizer is employed which is connected between the frame 10 and the midpoint of the axle 11 with the stabilizer extending longitudinally of the vehicle. Rigid connection of the element 6 to the frame 10 or, more particularly, to the spring 12 which is rigid with the frame 10 is readily effected through the use of the U-bolts 13 already present, thus obviating the necessity of additional attaching means. The element 6 which is designed to have a width exactly equal to the spacing between the U-bolts 13 is attached simply by the insertion of its free end between the U-bolts 13 and underneath the spring 12. A plate 15 is placed over the end of the element 6, which plate is of sufficient length to project through the U-bolts 13. It will be apparent that by now tightening the U-bolts 13 the element 6 will be firmly and rigidly clamped onto the spring 12 and hence with the frame 10. As an aid in preventing the element 6 from being pulled out from between the plate 15 and the spring 12, and as a further aid in retaining the element 6 against movement relative to the frame, the free end of the element preferably terminates in a slightly upturned flange 16. It is believed readily apparent that with the end of the element 6 thus firmly clamped to the spring 12 and, moreover, flanked on either side by the U-bolts 13, it is impossible for the element 6 either to shift laterally or to pivot relative to the frame 10 and spring 12.

The free end of the element 7 is fixed to the axle 11 in a generally similar manner. Thus the free end of the element 7 has a small upturned flange 17 which engages the forward edge of the axle 11 when the element 7 is placed beneath the axle to prevent rearward withdrawal thereof. Again a clamping plate 18 is placed beneath the element 7 and U-bolts 19 provided for clamping the plate and element 7 tightly against the axle 11. A second clamping plate 20 is positioned on top of the axle 11. This plate 20 is wider than the axle so as to provide space through which the U-bolts may pass. Preferably a single plate 20 is employed instead of an individual strip for each U-bolt 19, for in that manner the plate 20 serves to determine the spacing of the U-bolts 19 and holds them tightly against the sides of the element 7 to prevent any pivotal movement the same as the U-bolts 13 hold the element 6.

With the stabilizer thus rigidly attached to the axle and to the chassis frame and constructed as herein disclosed, it is readily apparent that the stabilizer will resist movement of the axle 11 transversely relative to the chassis frame 10. At the same time, the stabilizer will not interfere with the normal relative vertical movement between the axle and the frame which results in the flexing of the spring 12 since the stabilizer, particularly the elements 6 and 7, are readily flexible in that direction.

The stabilizer is deliberately designed to have no gravity load carrying capacity. In fact, because of its unique construction, wherein the elements 6 and 7 are joined in a free point, the stabilizer is free from any restraint on or strain from relative vertical movement between the frame and axle. In addition to resisting relative movement of the axle transversely of the frame, the stabilizer tends also to support the axle 11 against movement at right angles to the spring 12, that is, against lateral movement of the axle 11 under the strains resulting from high forward velocities, whether such strains be induced by the rotation of the wheels tending to produce a twisting of the axle or to other forces tending to bend the axle at the midpoint. It is also to be noted that the stabilizer has no joints or connections that can wear and become loosened or that require lubrication, and that it has no parts which are flexed to such extent that they might crystallize and eventually break as a result of repeated flexings, since the elements 6 and 7 are made of sufficient length to take care readily of the vertical movement that takes place between the axle 11 and the frame 10.

Fig. 4 shows the stabilizer applied to an automotive vehicle having a semi-elliptical spring. Automotive vehicles with that type of springing have frame elements 21 extending longitudinally of the vehicle, a reinforcing and strengthening cross bar 22, and a spring 23 connected at its ends in suitable manner to the member 21. Intermediate its ends the spring 23 is connected to the axle 11' in conventional manner, as by U-bolts 24. The stabilizer is basically of the same construction, differing only in minor respects to adapt it for use with the different form of springing. This difference resides primarily in that the flange 17 of the element 7' is bent downwardly and may even be formed as a hook 25 in order to enable the end of the element to be placed on top of the axle 11' instead of below the axle, as in Figs. 1 to 3. This change is occasioned by the slightly greater spacing between the axle and the frame which occurs with this type of springing. The free ends of the elements 6' and 7' are here both secured by means identical with that described for the clamping of the element 7' and Figs. 1 to 3. While it is sufficient to have but a single stabilizer again connected to the axle 11' and the cross bar 22 at their midpoints, it is possible with this type of springing to have a stabilizer connected adjacent to each spring 23 and thus obtain even enhanced effectiveness of the stabilizers.

Fig. 5 shows the stabilizer as adapted for use with automotive vehicles in which coil springs 26 are employed. Here again the stabilizer is basically the same as that disclosed in the previous figures having two leaf elements 6'' and 7'' of the same character and connected at their adjacent ends as above described, the free ends of the elements are, however, of different construction and each is formed to provide an offset portion 27 to be received in cup-like members 28 which are conventional parts of automotive vehicles having coil springs. With springing of this type, a stabilizer would be provided for each spring and would operate in all respects the same as when applied to the various types of springing employing leaf springs.

Where in the above description the term "axle" is used, it is intended to have a generic meaning covering either an axle which extends entirely across an automotive vehicle, as in Figs. 1 to 4, or the shortened individual axles which result when coil springs are employed. Moreover, while particularly in Figs. 1 to 4 the stabilizer has been disclosed as applied to the front axle of an automotive vehicle, it is to be understood that the application of the stabilizer is not limited to the front axle but is equally applicable and is intended to be employed in conjunction with the rear axle as well.

I claim as my invention:

1. In a vehicle having a chassis frame structure and an undercarriage structure, spring means interposed between the structures for supporting the chassis frame structure, and stabilizing means comprising a plurality of elements one of which is connected rigidly to the chassis frame structure and another of which is connected rigidly to the undercarriage structure with both elements extending longitudinally of the vehicle, said elements being yieldable in one direction and rigidly connected in a free point to permit relative movement of the frame and axle elements in that direction, and rigid in a direction transversely of the vehicle with the elements at the free point forming an angle of less than 135° to prevent relative movement between the structures transversely of the vehicle.

2. A nonload carrying stabilizer for use with a vehicle comprising a first wide leaf element adapted for rigid connection at one end with the chassis frame of an automotive vehicle with its width transversely of the vehicle, a second similar leaf element adapted for rigid connection at one end with its width transversely of the vehicle with the axle of the vehicle, said elements being joined at their remaining ends in an angular and rigid joint to make the stabilizer resistant to relative movement of its free ends in the direction of the width of the elements, each element being readily flexible normal to its plane to serve no spring function.

3. A stabilizer for use with an automotive vehicle comprising a first individual leaf element having a width many times its thickness so as to resist distortion in the plane of its surface while being readily flexible in a plane normal thereto, a second similar leaf element, means including a pair of U-bolts for securing one end of one of said elements rigidly with the frame of the automotive vehicle, similar means for securing one end of the other of said elements with the axle of the automotive vehicle, said elements extending longitudinally of the vehicle, and means for rigidly clamping togther in a free point the remaining ends of said elements holding the same against relative movement.

4. A stabilizer for use with an automotive vehicle comprising a first individual leaf element having a width many times its thickness so as to resist distortion in the plane of its surface while being readily flexible in a plane normal thereto, a second similar leaf element, means including a pair of U-bolts for securing one end of one of said elements rigidly with the frame of the automotive vehicle, similar means for securing one end of the other of said elements with the axle of the automotive vehicle, said elements extending longitudinally of the vehicle and disposed flatwise, and means for rigidly clamping together in a free point the remaining ends of said elements including at least two interlocking means to prevent relative pivotal or transverse shifting movement of said elements.

5. A stabilizer for use with an automotive vehicle comprising a first individual leaf element having a width many times its thickness so as to resist distortion in the plane of its surface while being readily flexible in a plane normal thereto, a second individual leaf element, one of said elements being adapted for connection flatwise rigidly at one end with the frame of an automotive vehicle and extending longitudinally of the vehicle, the other of said elements being adapted for rigid connection at one end to an axle element of the automotive vehicle and also extending longitudinally of the vehicle, and means including heavier, more rigid strips rigidly securing together the remaining ends of said elements in an angular joint.

6. A stabilizer for use with an automotive vehicle comprising a first individual leaf element having a width many times its thickness so as to resist distortion in the plane of its surface while being readily flexible in a plane normal thereto, a second individual leaf element, one of said elements being adapted for connection flatwise rigidly at one end with the frame of an automotive vehicle and extending longitudinally of the vehicle, the other of said elements being adapted for rigid connection at one end to an axle element of the automotive vehicle and also extending longitudinally of the vehicle, and means rigidly securing together the remaining ends of said elements in a face-to-face relationship.

7. In a vehicle having a chassis frame structure, an undercarriage structure and spring means supportingly interposed between the structures, a stabilizer nonsupportingly connected between the structures comprising a first wide leaf element rigidly connected at one end with the chassis frame structure, with its width transversely of the vehicle, a second similar leaf element rigidly connected at one end with its width transversely of the vehicle with the undercarriage structure, said elements being joined at their remaining ends in an angular and rigid joint to make the stabilizer resistant to relative movement of its free ends in the direction of the width of the elements, each element being readily flexible normal to its plane to serve no spring function.

8. In a vehicle having a chassis frame structure, an undercarriage structure and spring means supportingly interposed between the structures, a stabilizer non-supportingly connected between the structures comprising a first individual leaf element having a width many times its thickness so as to resist distortion in the plane of its surface while being readily flexible in a plane normal thereto, a second similar leaf element, one of said elements being disposed with its width transversely and its length longitudinally of the vehicle and rigidly connected at one end to the undercarriage structure at a plurality of points spaced in the direction of the width of said element to retain the attached end of said element against any movement relative to the undercarriage structure, the other of said elements being similarly disposed and similarly rigidly connected at one end to the chassis frame structure, and means rigidly securing together the remaining ends of said elements in a stiffened juncture.

9. In a vehicle having a chassis frame structure, an undercarriage structure and spring means supportingly interposed between the structures, a stabilizer non-supportingly connected between the structures comprising a first individual leaf element having a width many times its thickness so as to have substantial rigidity in the plane of its surface while being readily flexible in a plane normal thereto, a second wide element having substantial rigidity in the plane of its width, one of said elements being disposed with its width transversely and its length longitudinally of the vehicle and rigidly connected at one end to the undercarriage structure at a plurality of points spaced in the direction of the width of said element to retain the attached end of said element against any movement relative to the undercarriage structure, the other of said elements being disposed with its width transversely of the vehicle and similarly rigidly connected at one end to the chassis frame structure, and means rigidly securing together the remaining ends of said elements in a stiffening juncture.

10. In a vehicle having a chassis frame structure, an undercarriage structure and spring means supportingly interposed between the structures, a stabilizer non-supportingly connected between the structures comprising a first individual leaf element having a width many times its thickness so as to have substantial rigidity in the plane of its surface while being readily flexible in a plane normal thereto, a second element having substantial rigidity in the same direction as said first element, said first element being disposed with its width transversely and its length longitudinally of the vehicle and rigidly connected at one end to one of the structures at a plurality of points spaced in the direction of the width of said element to retain the attached end of said element against any movement relative to the structure to which it is attached, said second element being similarly rigidly connected at one end to the remaining one of the structures and disposed longitudinally of the vehicle with its rigidity transversely of the vehicle, and means rigidly securing together the remaining ends of said elements in a stiffened juncture.

11. In a vehicle having a chassis frame structure, an undercarriage structure and spring means supportingly interposed between the structures, a non-supporting stabilizer comprising a first portion having a width many times its thickness so as to have substantial rigidity in the plane of its surface while being readily flexible in a plane normal thereto, a second similar portion, each of said portions being disposed with its width transversely and its length longitudinally of the vehicle and rigidly interconnected at one end in substantially face to face relationship, the remaining end of one portion being rigidly connected to the chassis frame structure at a plurality of points spaced in the direction of the width of said portion to retain the attached end against any movement relative to the frame structure, and the remaining end of the other portion being similarly rigidly connected to the undercarriage structure.

12. In a vehicle having a chassis frame structure, an undercarriage structure and spring means supportingly interposed between the structures, a stabilizer non-supportingly connected between the structures comprising a first portion having substantial rigidity in one longitudinal plane and having flexibility in a direction normal to that plane, a second similar portion, each of said portions being disposed with its length longitudinally of the vehicle, its rigidity transversely of the vehicle and its flexibility in the direction of relative movement between the chassis and undercarriage structure during flexing of the spring means, the portions being rigidly interconnected at one of their ends in an angular relationship, the remaining end of one portion being rigidly connected to the chassis frame structure at a plurality of points spaced in the direction of the width of said portion to retain the attached end against any movement relative to the frame structure, and the remaining end of the other portion being similarly rigidly connected to the undercarriage structure.

13. In a vehicle having a chassis frame structure, an undercarriage structure and spring means supportingly interposed between the structures, a non-supporting stabilizer connected between the structures comprising a pair of supplementary portions, each having a width many times its thickness so as to have substantial rigidity in the plane of its surface while being readily flexible in a plane normal thereto and each disposed with its width transversely and its length longitudinally of the vehicle and rigidly interconnected to form a unitary means, the portions of which in the applied condition are curved and free to compensate for the elongation in distance between the undercarriage and chassis frame structure taking place upon recoil of the spring means, the remaining end of one portion being rigidly connected to the chassis frame structure at a plurality of points spaced in the direction of the width of said portion to retain the attached end against any movement relative to the frame structure, and the remaining end of the other portion being similarly rigidly connected to the undercarriage structure.

EDWIN BAGNALL.